June 5, 1934.  M. P. HITE  1,961,295
CALCULATING DEVICE
Filed April 12, 1932  2 Sheets-Sheet 1
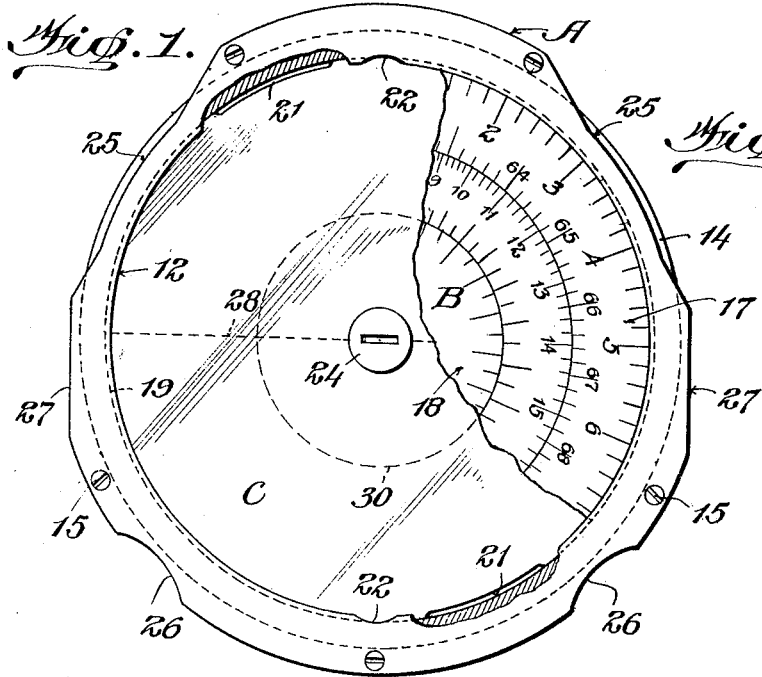
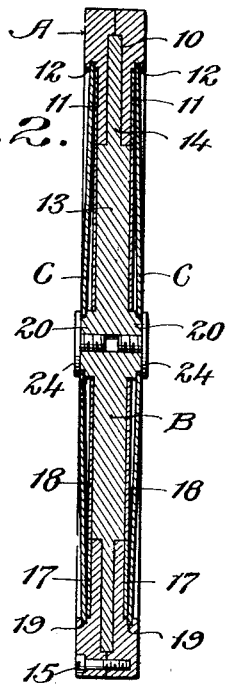
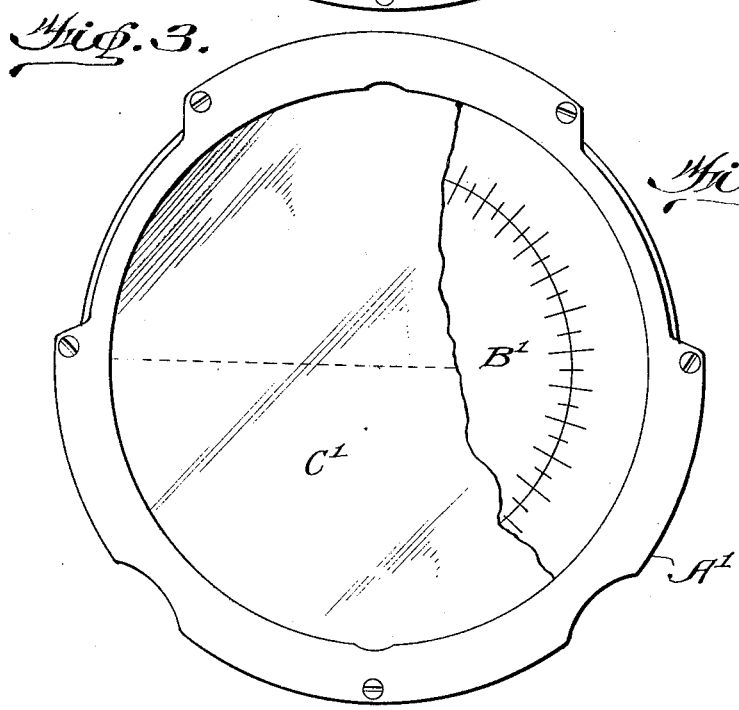
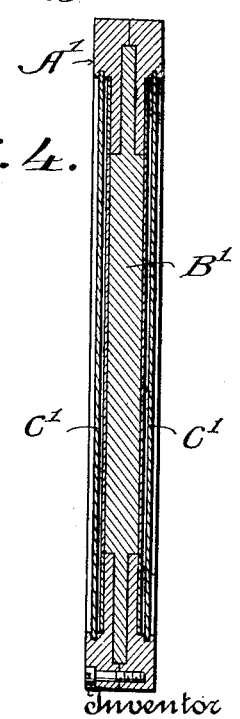
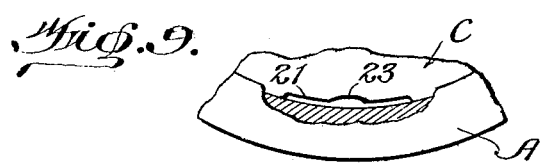
Inventor
Melville P. Hite,
by Carroll Bailey
Attorney

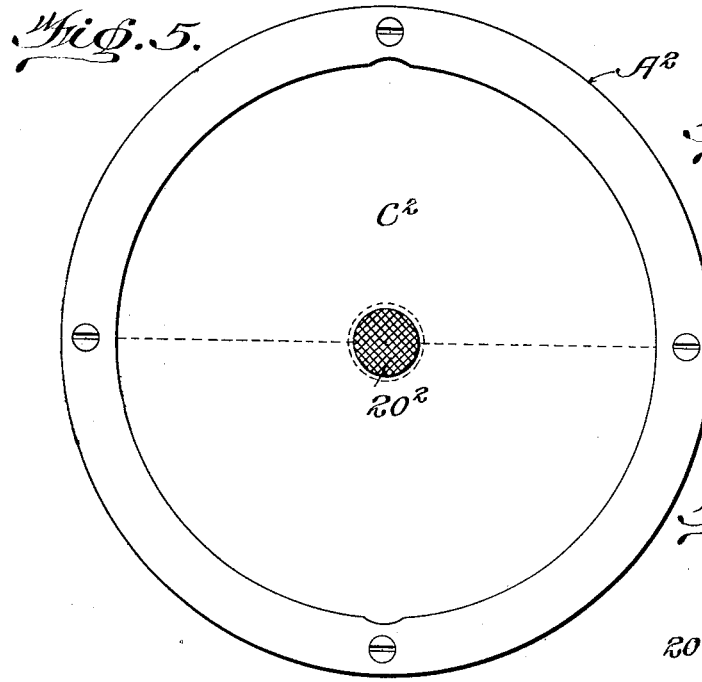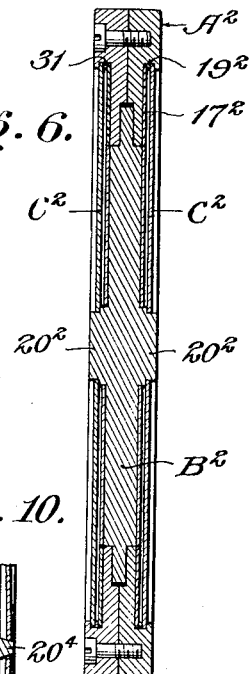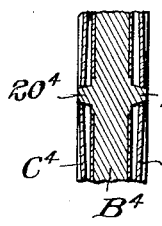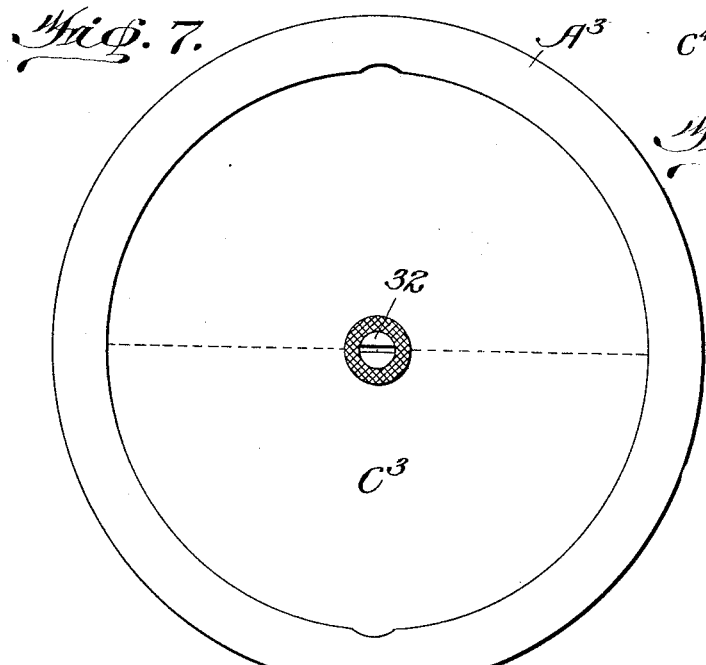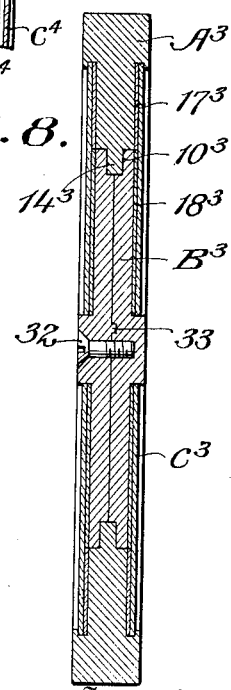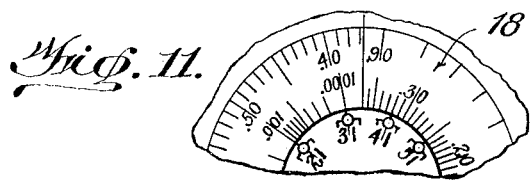

Patented June 5, 1934

1,961,295

UNITED STATES PATENT OFFICE 1,961,295

CALCULATING DEVICE

Melville P. Hite, Elizabeth City, N. C.

Application April 12, 1932, Serial No. 604,836

13 Claims. (Cl. 235—84)

This invention relates to calculating devices of the well known slide rule type, and has particular reference to a calculating device of this type consistently essentially of a plurality of superimposed members connected together for relative rotation and carrying cooperating calculating scales and markings which are adapted for use by relatively rotating the members to different positions. A calculating device of this general character is illustrated, for example, in my prior patent, No. 1,789,078, dated October 28, 1930, and some of the features of this patented device are used in the present device. In addition, the present device includes various other features of construction, combination and arrangement which are designed to render the device desirable from a facile and economical production standpoint and also from the standpoint of compactness in assembly, durability in use and facility, accuracy and reliability in operation.

Generally speaking, the present calculating device comprises a circular or substantially circular frame, a scale disk rotatably mounted within said frame, and a pair of transparent runner disks, one at each side of the scale disk, overlying the same and also mounted within the frame for rotation relative thereto and relative to the scale disk. Thus, two calculating means are embodied in a single unitary device, one at each side of the device, with the frame and the scale disk common to both; the structural arrangements at both sides of the device preferably but not necessarily being duplicates of each other. However, the device may, if desired, be constructed to have only a single calculating means at one side thereof. In either event, since the device is intended as an instrument to be carried in the pocket and in its preferred embodiment contemplates one-hand operation, an important consideration is to confine its face dimensions and its thickness within practicable limits and to provide at the same time for the use of scale and runner disks of the greatest diameter within the limits imposed by the intended manner of carrying and using the device, whereby the scales may be made as large and as legible as possible for convenient and facile reading of the same. Accordingly, a special object of the invention is to provide a frame which is of generally annular or ring-like form and of a size to accommodate scale and runner disks of the greatest practicable diameter, and which, at the same time, is of such shape as readily to be carried in the pocket and held in the hand for use and to afford a ready means of distinguishing between the top and the bottom of the device when the same is grasped for use.

Another object of the invention in respect to the shape of the frame is to provide the same with recesses exposing peripheral portions of the scale disk for finger engagement to effect rotation thereof, and with other recesses, one related to each of said first mentioned recesses, to accommodate the little finger when the device is held in the hand with either side thereof facing the user of the device, and to relatively arrange these recesses in a novel manner, whereby the device is easy to hold comfortably in an operative position and whereby all undesirable frame projections or protuberances to serve a like purpose as the second mentioned recesses and as heretofore provided are avoided.

According to the invention, the frame is provided with scale carrying faces which are flush with the side or scale carrying faces of the scale disk, and in this connection another object of the invention is to construct the frame with annular flanges surrounding said scale carrying faces whereby the scales carried thereby are protected against damage and against being torn or pulled from said faces in the event the scales are contained on sheets of paper or sheets of other material which are adhesively or otherwise united with said faces.

In order to construct the device of the least practicable thickness it is essential that the runner disk, or disks, as the case may be, shall be as thin as practicable. Moreover, said disks must not only be transparent, but they must also not be susceptible to breakage. Consequently, there are not many materials answering to these requirements from which the runner disks may be formed. Celluloid is a material answering to the requirements, but is not ideal due to its relatively high coefficients of contraction and expansion, to the effects of age and moisture thereon, and to its more or less constant tendency to curl and to change shape. However, celluloid or its equivalent is the only material of which I am aware from which the runner disks may practicably be formed. Accordingly, a particularly important object of the invention is to provide a device of the character mentioned employing runner disks of celluloid or equivalent material and embodying a construction whereby the inherent disadvantages of celluloid or the like as the material comprising said disks are substantially entirely overcome.

According to the invention the runner disks are confined at their peripheries within annular grooves in the aforesaid scale protecting flanges of the frame, whereby they are retained in operative assembly with the other elements of the device without the necessity of providing other means for this purpose and whereby various other advantages are obtained, such, for example, as excluding dust and dirt from the spaces between the disks and the scales, holding the disks against curling, protecting their edges and affording frictional means to hold the disks against rotation when the scale disk is rotated. In this connection, a further object of the invention is to so construct the runner disks that by the simple expedient of flexing the disks they may readily be sprung into or removed from the grooves, and to so construct the frame as to permit ready access to peripheral portions of the disks for the purpose of flexing them to effect their removal from the frame.

A further object of the invention is to provide improved scale identification means for scales used in calculating devices of the present general type.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein are illustrated different embodiments of the invention:

Figure 1 is an elevation of a calculating device constructed in accordance with one practical embodiment of the invention, parts being broken away to disclose details of the underlying structure.

Figure 2 is a central, transverse section through the device illustrated in Figure 1, the thickness of the parts being considerably exaggerated.

Figure 3 is a view similar to Figure 1 illustrating an alternative embodiment of the invention.

Figure 4 is a central, transverse section through the device illustrated in Figure 3.

Figure 5 is a view similar to Figures 1 and 3 illustrating another alternative embodiment of the invention.

Figure 6 is a central, transverse section through the device illustrated in Figure 5.

Figure 7 is a view similar to Figures 1, 3 and 5 illustrating another alternative embodiment of the invention.

Figure 8 is a central, transverse section through the device illustrated in Figure 7.

Figure 9 is a detail view illustrating an alternative embodiment of one of the features of the invention.

Figure 10 is a detail view illustrating an alternative embodiment of another of the features of the invention, and Figure 11 is a detail view illustrating certain scale designating symbols used on the present device.

Referring first to the embodiment of the invention illustrated in Figures 1 and 2 of the drawings, it will be observed that the device is inclusive, principally, of a circular frame in the form of a ring, designated generally as A, a scale carrying disk, designated generally as B, and a pair of so-called runner disks, designated as C, C, respectively.

Provided in the frame ring A midway between the sides thereof is an annular channel 10 of suitable width which opens through the inner edge of the ring and which terminates at its outer end or bottom inwardly of the outer edge of the ring, while, as shown, the inner portion of the ring is of less thickness than the outer portion thereof whereby the flat side faces 11, 11 of the inner portion are disposed inwardly of the side faces of the outer portion, the outer limits of the faces 11, 11 being defined by the inner faces of annular flanges 12, 12, respectively.

The scale carrying disk B is disposed within the frame ring A and is inclusive of a body portion 13 which is of a diameter to fit neatly and rotatably within said ring and which is of a thickness corresponding to the thickness of the inner portion of the ring. In addition, an annular tongue or flange 14 extends from the periphery of the body portion 13 of the disk and is received neatly by the frame channel 10, whereby the disk is mounted within the frame for rotation relative thereto and whereby the flat side faces of the body portion 13 thereof are held flush with the side faces 11, 11 of the frame.

In order to permit assembly and disassembly of the disk B with and from the frame ring A, the latter is divided either medially or at any other suitable location in the plane thereof, and the two mating sections of the frame are detachably fastened together by screws or other fasteners designated as 15, the said frame sections either being molded from suitable resinous or aldehyde condensation material, or being formed in any other suitable manner from any other suitable material.

Suitably provided either directly on the flat faces 11, 11 of the frame A and on the flat sides of the body portion of the disk B, or on sheets 17 and 18 of paper or other suitable material glued or otherwise suitably fastened flat against said faces, respectively, are scales which are adapted for cooperation with each other and with lines on the runner disks C, C by rotation of the disk B relative to the frame and by relative rotation between the disk B and the runner disks. The scales partially illustrated in Figure 1 may be of any of the various well known types used in the slide rule art, or of any other type, and therefore they are merely illustrated conventionally in the present instance, particularly since the invention is concerned primarily with the construction of the device and especially to a construction permitting the use of different scales on different sides of the device, although this is not essential and the device may, if desired, be constructed to have scales on one side thereof only.

Formed in each of the two annular flanges 12, 12 of the frame A is an annular groove 19 of any suitable depth and of a width to neatly rotatably receive the peripheral edge portion of the related runner disk C, one of which is disposed at each side of the device as shown. If scale sheets such as 17 and 18 are employed the inner side walls of the grooves 19 are disposed flush or substantially flush with the outer faces of said sheets. On the other hand, if scale sheets are not employed and the scales are provided directly on the faces 11, 11 of the frame and the side faces of the disk B, respectively, the inner side walls of the grooves 19 are disposed flush or substantially flush with the faces 11, 11. In either case it obviously follows that when the peripheral portions of the runner disks C are disposed within said grooves the inner faces of the runner disks, at least marginally thereof, are disposed very closely adjacent to the underlying scales.

Formed on each side of the scale carrying disk B, centrally thereof, is a circular hub-like projection 20 which at its outer end is reduced in diameter, as indicated at 21, to provide a shoulder or seat for the central portion of the related runner disk C, each runner disk having a central opening to receive the reduced portion of its related projection 20 so that, as aforesaid, the central portions of the runner disks seat against the shoulders formed by reducing the outer end portions of the projections, in which connection it is pointed out that said shoulders are disposed slight distances outwardly relative to the scale faces of the disk B, if the scales are formed directly on said disk, or relative to the outer faces of the scale elements 18, as the case may be, whereby the central portions of the runner disks C, C are maintained slightly spaced from the scales.

Referring to Figure 1 of the drawings, it will be observed that each runner disk C is marginally recessed at diametrically opposite points as indicated at 21. Thus by bending, flexing, or otherwise distorting said disks diametrically on lines passing through the centers or substantially through the centers of the recesses 21' it is possible to insert the disks within the flanges 12 of the frame A with the marginal portions of the disks alined with or partially entered in the grooves 19 whereby, upon subsequent release of the disks, and due to their inherent tendency to assume their normally flat or substantially flat condition, their marginal edge portions will be projected into the grooves 19 and their central portions will come to rest against the aforesaid seats or shoulders of the projections 20 of the disk B. On the other hand, to remove the disks C whenever and for any purpose desired, it is simply necessary to flex the disks outwardly. To facilitate this operation the lips of the frame A constituting the outer walls of the grooves 19 may be recessed at any one or more points, as indicated at 22 to permit the finger nails or any suitable instrument to be engaged under the edges of the disks C to effect their outward bending or flexing, and in this connection it may be additionally desirable to provide the disks C with some suitable marks indicating the centers of the recesses 21 to facilitate their location in alinement with the recesses 22.

Obviously, instead of recessing the frame as at 22, the edges of the recessed portions 21 of the disks C may have finger nail recesses 23 formed therein as illustrated in Figure 9, or these recesses 23 may be provided in addition to the recesses 22. Also, as is obvious, instead of providing the disks C with diametrically opposed recesses, each disk may be provided with only a single peripheral recess to permit engagement and disengagement of its marginal portion with and from the related groove 19 by suitable flexure or distortion of the disk in the general manner stated.

As illustrated in Figure 2 of the drawings, the shoulders of the projections 20 against which the central portions of the runner disks seat, are disposed slightly outward relative to the grooves 19. Accordingly, when the marginal portions of said disks are operatively engaged in the grooves 19 of the frame and the central portions of the disks are seated against the shoulders of the projections 20, the disks in traverse section have a slightly conical shape which prevents any looseness between the disks and either the frame A or the scale disk B. Moreover, when the runner disks are operatively engaged with the frame A they obviously are retained in assembly therewith in the absence of any auxiliary retaining means. If desired, however, screws 24 may be threaded in a central opening formed through the scale disk B and said screws may have heads to overlie the inner portions of the disks C to positively hold the central portions of said disks C against outward movement relative to the disk B.

The disks C are formed from any suitable transparent, flexible material such, for example, as celluloid, while the disk B may, like the frame A, be molded or otherwise formed from any suitable material.

Regarding the frame A, it will be observed that the same is marginally cut away to either side of the vertical center and above the horizontal center of the device, as indicated at 25, to expose peripheral portions of the flange 14 of the disk B for finger engagement to effect rotation of said disk relative to the frame A. It will also be observed that to either side of the vertical center and below the horizontal center of the device the frame A is recessed, as indicated at 26. The device is intended for one-hand operation by holding the device in the palm of the hand with the little finger engaged in one of the recesses 26 to assist in preventing rotation of the device, and when the device is thus held the thumb and forefinger or index finger rest naturally against the edge of the flange 14 where the same is exposed through the cut away portions 25 of the frame for facility in rotating the disk B. At the same time the thumb is disposed to be readily shifted upon the outer face of the disk C at the side of the device facing the user for facility in rotating this disk. In this connection it is pointed out that due to the greater friction between the disks C at their margins with the frame A than at their centers with the disk B, rotation of the disk B does not result in rotation of the disks C, while conversely, rotation of the disks C does not result in rotation of the disk B.

In order to reduce the width of the device as much as possible opposite side portions of the frame A are cut away, as indicated at 27, preferably along vertical lines parallel to each other.

The disks C each carry a so-called runner line 28 or other line or lines or markings for cooperation with the scales of the frame A and the disk B in a manner well known in the art, and said line, lines or markings may be provided on either the inner, the outer, or on both the inner and the outer faces of said disks. Since the disks C are spaced from the scale carrying surfaces of the frame A and the disk B, however, in order to avoid scarring or dulling of the scales and the disks C, it is desirable to provide a circular line 29 on each disk C concentric with the axis thereof, and to provide a similar line on each side of the disk B in registration with the lines 29 to facilitate proper positioning or holding of the device before the eyes so as to avoid any error in computations which might result due to refraction or so-called parallax in the event some such guide means were not provided to assist in readily ascertaining the correct position of the device before the eyes.

By reason of the recessing of the frame A in the manner described, it is apparent that the calculators provided at either side of the device are usable with equal facility.

Referring particularly to the embodiment of the invention illustrated in Figures 3 and 4 of the drawings, it will be observed that the construction is generally the same as shown and described in connection with the embodiment of the invention illustrated in Figures 1 and 2, except that the central projections on the scale disk B' are eliminated and that the disks C', instead of being centrally apertured to receive central projections of the disk B', are closed at their centers. Obviously, when the disks C' of the embodiment of the invention illustrated in Figures 3 and 4 are operatively engaged with the frame A', said disks C' lie in planes parallel to the planes of the outer faces of the disk B'.

Referring particularly to the embodiment of the invention illustrated in Figures 5 and 6 of the drawings, it will be observed that the construction again is generally the same as shown and described in connection with the embodiment of the invention illustrated in Figures 1 and 2, except that the frame A2 is not peripherally recessed to expose the flange of the disk B2, but on the contrary is of regular circular form. This embodiment of the device is intended for two hand operation, and to that end the projections 20² of the disk B2 are extended outwardly slightly beyond the outer faces of the disks C2 and are serrated or knurled at their outer ends for finger engagement to effect rotation of the disk B2. Figure 6 shows in addition that the edges of the runner disks C2 and the edges of the scale sheets 17² may extend into common grooves 19² in the frame A2 and that the disks C2 may be maintained marginally spaced from the scale sheets 17² by thin and narrow interposed rings 31 of any suitable material.

Figures 7 and 8 of the drawings illustrate an embodiment of the invention which in substance is a reversal of the embodiments of the invention illustrated in Figures 1 to 6. That is to say, the frame A3 is formed in one piece and the disk B3 is formed in two pieces, the disk having an annular channel 10³ receiving an annular rib 14³ extending inwardly from the frame. The disk B3 may be divided in the plane thereof either medially as shown or in any other desired place, and the two sections of said disk may be fastened together by a single central screw 32 as shown or in any other desired manner. Moreover, where only a single central fastener such as the screw 31 is employed to secure the two sections of the disk together, one of the sections may have a lug or the like 33 formed thereon to fit into a recess in the other section to hold the two sections against relative rotation. In other respects the embodiment of the invention illustrated in Figures 7 and 8 is substantially tthe same as the embodiment of the invention illustrated in Figures 5 and 6. Figure 8 illustrates, however, that the runner disks C3 may be disposed flat against the scale sheets 17³, 18³ of the frame A3 and the disk B3, respectively, or directly against the equivalent faces of the frame and said disk B3 in the event the scales are provided directly on said faces instead of on sheets secured thereto.

Obviously, practically any feature of any one of the different illustrated embodiments of the invention may be embodied in practically any one of the other embodiments of the invention.

Referring particularly to Figure 10 of the drawings, it will be observed that the scale carrying disk B4 of the device is provided centrally with projections 20⁴ which are of conical shape, and that the runner disks C4 are provided centrally with openings to receive said conical projections. By this construction a neat fit of the runner disks with the projections 20⁴ is afforded at all times to maintain a true concentric relation of the runner disks with the scale disk and the frame. This construction is particularly adapted for use in an embodiment of the invention as illustrated in Figure 2.

A feature of the invention resides in the provision of novel means in the form of compound symbols for the ready identification and the furnishing of clues as to the value of certain fractional scales used in a calculating device of the present general type, particularly scales of fractions having numerous decimal places, the symbols being compact and occupying very little space on the faces of the scales whereby their use renders practicable the use of the enormous range of log-log scales from .000,000,-000,1 to 1,000,000,000. In other words, it obviously is necessary, if scales of fractions having numerous decimal places are to be used in a device of the present kind, to provide means to identify the values of the scales, and since, heretofore, the only means for this purpose to my knowledge has been to print the actual fractional value of any particular scale on the face of the scale, the impracticability of the use of scales of fractions having, for example, more than three or four decimal places is manifest, because of the lack of space on the scales to accommodate identification means of such size as to be legible.

In accordance with the invention compound symbols occupying small spaces on the scale faces are employed to identify fractional scales and to furnish indications of their values, each symbol being inclusive of three elements; viz., an identification element to designate usage of the scale, an element to designate the number of decimal places in the fraction to which the scale corresponds, and an element to designate the value of the fraction. Thus, as illustrated in Figure 11 of the drawings each compound symbol is inclusive of an appropriate character, such as a winged "O" shown as the identification element, and a two digit Arabic number the respective digits of which constitute the second and the third elements of the symbol, the first digit being employed to designate the number of zeros in the fraction and the second digit being employed to designate the value of the fraction. Consequently, in the example illustrated "11" indicates one decimal place in a fraction having the value of 1; "21" indicates two decimal places in a fraction having the value of 1 and so on. If the values of the fractions were four and five for example, the numbers 11 and 21 then would be 14 and 25 and so no. Thus, practically any fraction may be identified and its value indicated by a symbol which occupies only a relatively small amount of space on the scale, whereby as aforesaid, the use of the enormous range of log-log scales in a device of the present kind is rendered entirely feasible.

From the foregoing description considered in connection with the accompanying drawings, it is believed that the construction, manner of use, and the advantages of the invention will be clearly understood. In recapitulation, however, it is pointed out that due to the shape of the frame of the device, particularly as illustrated in Figure 1, the use of scales of maximum diameter is permitted while the length and width of the device as an entirety are confined within limits adapting the device as a pocket implement for one-hand operation; that due to the novel construction of the device it does not possess excessive thickness or bulk; and that due to the novel manner of mounting the runner disks their operative shape is maintained despite any tendency of the material from which they are formed to contract, expand or curl, it being pointed out in this connection, that normally slight clearances exist between the peripheral edges of the disks and the bottoms of the grooves in which their edges are received whereby free contraction and expansion of the disks is permitted. Moreover, in this connection and regarding the center supports for the disks as illustrated in Figure 10, it is apparent that the conical shape of the supports serves to compensate for any enlargement of the center openings of the disks due to wear so that true concentric relations of the disks with the other elements of the device are maintained at all times, the disks moving inwardly on the conical supports under the influence of their inherent and constant tendency to assume flat conditions as wear occurs. Furthermore, in this connection and as heretofore intimated, any undesirable looseness of the runner disks obviously is prevented in embodiments of the invention where the disks have center supports cooperating with the frame grooves to hold the disks conically dished, due to the stored energy in the disks acting to urge their center portions inwardly against the supports and their marginal portions outwardly against the outer side walls of the frame grooves.

While certain specific embodiments of the invention have been illustrated and described, it is pointed out that some or all of the features of the invention may be embodied in specifically different mechanical structures within the spirit and scope of the invention as defined in the appended claims.

I claim:

1. A device of the character described comprising a frame, an annular flange extending forwardly from the frame, said flange having an annular groove, and a flexible runner disk having its peripheral portion disposed within said groove, said disk being peripherally recessed whereby the disk is adapted by distortion to have its peripheral portion engaged within and disengaged from said groove.

2. A device as set forth in claim 1 in which the edge of the recessed portion of the disk is disposed substantially in alinement with the inner face of the annular flange, and in which the disk is provided with a smaller recess opening into the first mentioned recess to permit engagement of suitable means with the disk to facilitate its distortion for removal from the groove.

3. A device as set forth in claim 1 in which the flange is provided with a recess forwardly of and opening into the groove to afford access to the peripheral portion of the disk for the purpose of distorting the disk to effect its removal from the groove.

4. In a calculating device of the character described, a ring-like frame and a disk rotatably mounted therein, the frame having a pair of peripheral recesses exposing peripheral portions of the disk and further having a pair of finger accommodating peripheral recesses, said recesses being disposed substantially ninety degrees apart and in quadrants formed by a pair of right angularly extending axes passing through the center of the device, the periphery of the frame at the terminii of one axis being straight and substantially parallel to the other axis.

5. A calculating device as set forth in claim 4 in which the width of the frame between the straight sides thereof at the terminii of one axis is substantially less than the width of the frame along the other axis.

6. In a calculating device of the slide rule type, a fractional scale identification and value indicating means, comprising a compound symbol inclusive of three elements; viz., a scale identification element, an element to designate the number of zero places, and an element to designate the value of the first significant figure of the fraction.

7. A device of the character described comprising a frame, an annular flange on the frame, said flange having an inwardly opening annular groove, and a flexible disk having its peripheral portion disposed within said groove, said flange outwardly of said groove having a recess opening into the groove to permit the disk by distortion thereof to have its peripheral portion inserted into and removed from the groove.

8. In a device of the character described, a frame having an annular groove, a flexible disk having its peripheral portion disposed in said groove, and a disk pivot element centrally of the disk holding the disk against lateral shifting movement and also maintaining the central portion of the disk under outward flexure.

9. In a device of the character described, a frame having an annular groove, a flexible disk having its peripheral portion disposed in said groove, a second disk rotatably mounted within said frame, and a pivot element for the first mentioned disk disposed centrally of said first mentioned disk and holding said first mentioned disk against lateral shifting movement, said pivot element being carried by the second mentioned disk and maintaining the central portion of the first mentioned disk under outward flexure.

10. In a device of the character described, a ring-like frame having a scale carrying side face, an annular flange extending forwardly from the frame outwardly of said scale carrying side face, said flange having an inwardly opening annular groove, a flexible disk having its peripheral portion disposed in said groove, and a disk pivot element centrally of the disk holding the disk against lateral shifting movement and also maintaining the central portion of the disk under outward flexure.

11. In a device of the character described, a ring-like frame having a scale carrying side face, an annular flange extending forwardly from the frame outwardly of said scale carrying side face, said flange having an inwardly opening annular groove, a flexible disk having its peripheral portion disposed in said groove, a second disk rotatably mounted within the frame, and a pivot element for the first mentioned disk disposed centrally of said first mentioned disk and holding said first mentioned disk against lateral shifting movement, said pivot element being carried by the second mentioned disk and maintaining the central portion of the first mentioned disk under outward flexure.

12. In a device of the character described, a frame having an annular groove, a flexible disk having its peripheral portion disposed in said groove, said disk having a central opening therein, and a disk pivot element of conical form disposed in said opening, said opening being of less diameter than the base portion of said pivot element and the latter being disposed to snugly fit said opening and to maintain the central portion of the disk flexed outwardly, thereby to hold the disk against lateral shifting movement and to hold the peripheral portion of the disk engaged with the outer wall of the groove.

13. A device as set forth in claim 12 in which a second disk is rotatably mounted within the frame and in which the pivot element for the first mentioned disk is carried by said second mentioned disk.

MELVILLE P. HITE.